(12) United States Patent
Kaspit et al.

(10) Patent No.: US 7,388,827 B2
(45) Date of Patent: Jun. 17, 2008

(54) HIGH SPEED DISSEMINATION OF FAILURE INFORMATION IN MESH NETWORKS

(75) Inventors: Idan Kaspit, Rosh Ha'ayin (IL); Eli Korall, D.N. Shimshon (IL)

(73) Assignee: ECI Telecom Ltd., Petach Tikva (IL)

( * ) Notice: Subject to any disclaimer, the term of this patent is extended or adjusted under 35 U.S.C. 154(b) by 954 days.

(21) Appl. No.: 10/466,439

(22) PCT Filed: Oct. 23, 2002

(86) PCT No.: PCT/IL02/00844

§ 371 (c)(1),
(2), (4) Date: Jul. 16, 2003

(87) PCT Pub. No.: WO03/045007

PCT Pub. Date: May 30, 2003

(65) Prior Publication Data

US 2004/0156633 A1    Aug. 12, 2004

(30) Foreign Application Priority Data

Nov. 20, 2001    (IL)    ................................ 146588

(51) Int. Cl.
*H04L 12/26* (2006.01)
(52) U.S. Cl. ........................ 370/216; 370/242
(58) Field of Classification Search ............... 370/226, 370/227, 243
See application file for complete search history.

(56) References Cited

U.S. PATENT DOCUMENTS

| | | | | |
|---|---|---|---|---|
| 5,065,399 A | | 11/1991 | Hasegawa et al. | |
| 5,093,824 A | * | 3/1992 | Coan et al. | 370/228 |
| 5,235,599 A | * | 8/1993 | Nishimura et al. | 714/4 |
| 5,550,805 A | | 8/1996 | Takatori et al. | |
| 5,687,168 A | * | 11/1997 | Iwata | 370/255 |
| 5,781,529 A | * | 7/1998 | Liang et al. | 370/218 |
| 5,914,794 A | * | 6/1999 | Fee et al. | 398/20 |
| 6,430,150 B1 | * | 8/2002 | Azuma et al. | 370/218 |
| 6,496,476 B1 | * | 12/2002 | Badt et al. | 370/228 |
| 6,515,777 B1 | * | 2/2003 | Arnold et al. | 398/97 |
| 6,725,401 B1 | * | 4/2004 | Lindhorst-Ko | 714/47 |
| 6,956,816 B1 | * | 10/2005 | Alexander et al. | 370/222 |
| 6,992,978 B1 | * | 1/2006 | Humblet et al. | 370/228 |
| 2004/0179471 A1 | * | 9/2004 | Mekkittikul et al. | 370/218 |
| 2004/0223451 A1 | * | 11/2004 | Homma et al. | 370/228 |

OTHER PUBLICATIONS

"A Proposed Link Capacity Adjustment Scheme (LCAS) for Sonet Virtually Concatenated SPEs," Nevin Jones et al, Oct. 2000.
"The Selfhealing Network a Fast Distributed Restoration Technique for Networks Using Digital Crossconnect Machines," W.D. Grover, University of Alberta, Nov. 1987.

* cited by examiner

*Primary Examiner*—Chi Pham
*Assistant Examiner*—Kevin Mew
(74) *Attorney, Agent, or Firm*—Browdy and Neimark

(57) ABSTRACT

A method for high speed dissemination of information about faults in spans that interconnect nodes in a telecommunication mesh-type network, the method comprises creating a Failure Updating channel (FU channel) in the network and circulating Failure updating messages (FU messages) via the FU channel between the network nodes, wherein each of the FU messages issued by a particular node is disseminated to its adjacent node(s) and carries information about all spans in the network currently available to the particular node, by presenting status indications of the spans in respective information slots of the FU message.

18 Claims, 2 Drawing Sheets

| NONS PREVIOUS STATE | INPUT FU | | | | |
|---|---|---|---|---|---|
| | | | IDLE | SF | TF |
| (3) IDLE | | | 3 | 1 | 4 |
| (2) SF | | | 5 | 2 | 1 |
| (3) TF | | | 1 | 4 | 3 |

HIGH SPEED DISSEMINATION OF FAILURE INFORMATION IN MESH NETWORKS

FIELD OF THE INVENTION

The present invention relates to a technique for distributing information about failed links between nodes of a mesh network

BACKGROUND OF THE INVENTION

Mesh networks, contrary to ring networks, are those comprising a number of inter-linked star-like connections between NE (network elements). A connection between two adjacent NE is usually called a span.

To perform urgent path restorations and other reconfiguring actions in the network when failures occur, either NEs or any managing entity should be informed on the current condition of each span in the network, and in the minimal time.

Presently, this service action is usually provided by a so-called network management station (NMS) of the network, via service channels. The NMS has a network level view of the "network health status". NMS receives notifications and alarms about failed links and re-calculates new trails in the network to bypass such links. The information/instructions with respect to the new corrected trails is then downloaded to the relevant network elements. The described process is known as a restoration process. In mesh networks, it takes a considerable time for execution due to complexity of configuration of such networks.

The OSPF protocol (Open Short Path First protocol) which is widely used in IP networks relates to the family of "link state protocols". This protocol enables exchanging the routing information which has been updated due to the network topology changes (span addition/deletion, failure). It is a complex and highly software dependent protocol. A considerable portion of the time is required for updating NMS and each and every node in the network about the new status of the "network health". Furthermore, the restoration cannot be accomplished if the NMS is down by any reason.

OBJECT OF THE INVENTION

It is therefore the purpose of the present invention to provide a technique overcoming the above-mentioned drawbacks, i.e., enabling accelerated dissemination of failure information in mesh networks.

SUMMARY OF THE INVENTION

The solution proposed below allows for the high speed dissemination of the information on faults in a mesh network, enabling for fast restoration of the faulty paths. For non-mesh networks, the restoration time up to 50 ms is stated by a number of standards of international standard bodies such as ITU-T, ANSI, BELLCORE. This time is counted for completing the restoration after a fault is detected and, by now, has been considered too short for mesh networks due to their complexity. The proposed solution enables reaching this limit in the mesh networks, too.

To ensure high speed dissemination of information about faults in spans that interconnect nodes in an optical mesh network, there is provided a method which comprises creating a Failure Updating channel (FU channel) in the network and circulating Failure Updating messages (FU messages) via said FU channel between the network nodes, wherein each of the FU messages reflects status of all spans in the network.

In practice, each FU message may comprise a number of information slots not less than the number of spans in the network, wherein each of the slots being adapted to carry a status indication of a particular network span in a form of a predetermined code.

Preferably, the FU channel can be created in the information channel of the network. For example, the FU channel can be ensured using overhead bytes of a SONET/SDH frame or multiframe for periodically transmitting said FU messages via said bytes.

Alternatively, when the invention is employed in an optical transmission system such as OTN, a so-called OSC channel can be used as the FU channel. The OSC channel is an Optical Supervisory Channel transmitted in parallel with the information optical channels between network elements.

Let an input FU message be a FU message entering a network node from an adjacent node during a time period t (in a simplified example, can be called clock t), and carrying status information on all spans of the network, which information is available to the adjacent node. The network node may receive one or more input FU messages during a predetermined time period.

Let an output FU message be a FU message issued by the network node after the time period t (for example, at clock t+1) and comprising updated status information on all spans of the network, which became available to the network during the time period t.

Let a previous output FU message be an FU message issued by the network node during the time period t (or at clock t), and comprising the previous status information on all network spans known to the node before the updating (i.e., collected by the time period t, or at clock t−1).

According to the method, each network node permanently (per clock) receives one or more input FU messages from its adjacent nodes and issues its output FU message to the adjacent nodes.

To understand the above method, the following definitions are to be introduced. Any particular node in the network is considered to be an originating node (ON) with respect to at least one associated span (ONS) on which the node is able to directly detect one or more events (such as alarms) and based on that originates status of the ONS and disseminates it in the network via its output FU message, and a non-originating node (NON) with respect to any other network span (NONS) not associated with said node, the non-originating node does not originate status of any NONS but judges about a status of a particular NONS based on status information concerning this NONS, being available at said node owing to the FU messages circulation; each of the nodes therefore operating in two modes being an originating mode and a non-originating mode.

In the method, the step of circulating the FU messages (actually comprising circulation of status information on all the network spans between all the network nodes) implies performing the following actions at each network node and at each clock:

for one or more spans (ONS) associated with said node (ON), originating respective status information;

for spans (NONS) not associated with said node (NON), forming respective status information based on the previous status information and status information in one or more input FU messages available in said node;

combining the status information originated for ONS and the status information formed for NONS, and forwarding it to all adjacent nodes as the output FU message of said node.

In view of the above, to perform the step of originating status information for the ONS spans, the method comprises steps of:

defining a state machine (SM) of an originating node, assigned to a particular span (ONS) associated with its originating node (ON), the state machine comprising more than two states and providing transitions from state to state; said states and transitions depending on presence or absence of said one or more alarms or other events on a particular span (ONS), wherein the states of the state machine (SM) respectively correspond to possible statuses of a particular span (ONS);

providing at each node of the network one or more said state machines (SM) respectively assigned to one or more spans (ONS) associated with said node as with their originating node, thereby ensuring that status of each particular span of the network is originated and permanently updated at its associated ON.

To ensure forming the status information for the NONS spans (by the nodes in the non-originating mode —NON), the method comprises:

storing, at each node of the network, a previous output FU message of the node reflecting the previous status information on all spans of the network known to the node;

applying, at each node of the network, status rules for forming status information for the NONS spans based on the respective previous status information and respective status information in the one or more input FU messages.

Based on the above definitions and explanations, the process of circulating the FU messages in the mesh network is performed in such a manner that:

each node receives a number of input FU messages from its adjacent nodes and issues its output FU message to the adjacent nodes;

each node acting in the originating mode with respect to its particular associated span (ONS) originates status thereof in the output FU message based on the previous status of said span and the alarms/events if detected on said span, (according to the corresponding state machine SM and regardless a status of said span in any of the FU messages received at the node), each node acting in the non-originating mode with respect to span(s) (NONS) not associated to it, updates the previously known status of any particular NONS in the output FU message, using the status rules.

It should be noted that the process of circulating is performed independently at any node i.e., adjacent nodes of a particular node may send to it different FU messages during a stabilization period of the FU messages, and after that stabilization period their FU messages should become the same. The stabilization period is checked and stated empirically—the larger the network, the higher the period.

The state of stability is achieved as a result of gradually (step by step) updating status of spans at each network node based on the input FU messages and alarms the node receives, and by continuously (step by step) disseminating the updated status of each span by issuing an output FU message from the node.

Preferably in the above method, the status rules used for updating the status of a particular span NONS in the output FU message of a node comprise a table of priorities. These rules and tables are logically identical at all nodes throughout the network.

In the table of priorities, the priorities are arranged by taking into account:

the previous status of a particular NONS (transmitted by said node in the previous output FU message), status(es) of the particular span NONS received at the node in one or more FU messages, direction of transitions of the state machine SM.

According to one version proposed by the Inventors in the frame of the method, the priorities are stated as follows:

the highest priority is assigned to a status of the particular span NONS corresponding to such a state of the state machine SM which is positioned one transition forward from the state of said machine corresponding to the previous status of the NONS span, the priority lower than but next to the highest is assigned to the previous status of said NONS span, i.e. to its unchanged status, the lowest priority is assigned to a status of the particular NONS span corresponding to such a state of the state machine SM, which is positioned one transition backward from the state of the state machine SM corresponding to the previous status of the NONS span.

The above defined rules and priorities can be applied when NON (i.e., the node in a NON mode) receives one or more FU messages during a predetermined time period (or at a clock).

Preferably, the step of updating status of NONS at NON further comprises the following steps:

if the status of a particular NONS span is equal in all input FU messages which can be received at the node, accepting said equal status for the output FU message regardless a previous status of said NONS (and therefore the priority of said status);

when receiving input FU messages carrying different statuses with respect to one and the same NONS, selecting for the output FU message such a status of said span which has the highest priority among those received at said NON including the previous status of said NONS.

According to another aspect of the invention, there is proposed a system for implementing the described method in mesh networks, the system comprising a fault updating (FU) channel for circulating input and output FU messages between nodes of the network, the FU messages carrying status information on all network spans; the FU channel being arranged by providing each node in the mesh network with means for receiving the input FU messages from adjacent nodes and for transmitting the output FU messages to the adjacent nodes; each node being provided with a memory and a processing means for updating status information of all network spans in the output FU messages it issues.

In the system, each of the nodes is preferably provided with means for detecting events such as alarms on one or more network spans associated with said node and a state machine SM for originating status information concerning said spans (originating spans ONS) based on said alarms; and also provided with status rules for updating status information concerning network spans not associated with said node (non-originating spans NONS).

The memory of a node being preferably utilized for storing a previous output FU message, the events, the SM, the input FU messages and the status rules; the processing means being operative to perform the SM transitions to obtain status information of the ONS spans, capable of applying the status rules to form status information of the NONS spans, and adapted to combine the obtained status information of all network spans in an output FU message of the node.

Details of the invention will become apparent as the description proceeds.

BRIEF DESCRIPTION OF THE DRAWINGS

The invention will be further described and illustrated with the aid of the following non-limiting drawings in which.

DETAILED DESCRIPTION OF EXEMPLARY EMBODIMENTS

Figure 1:
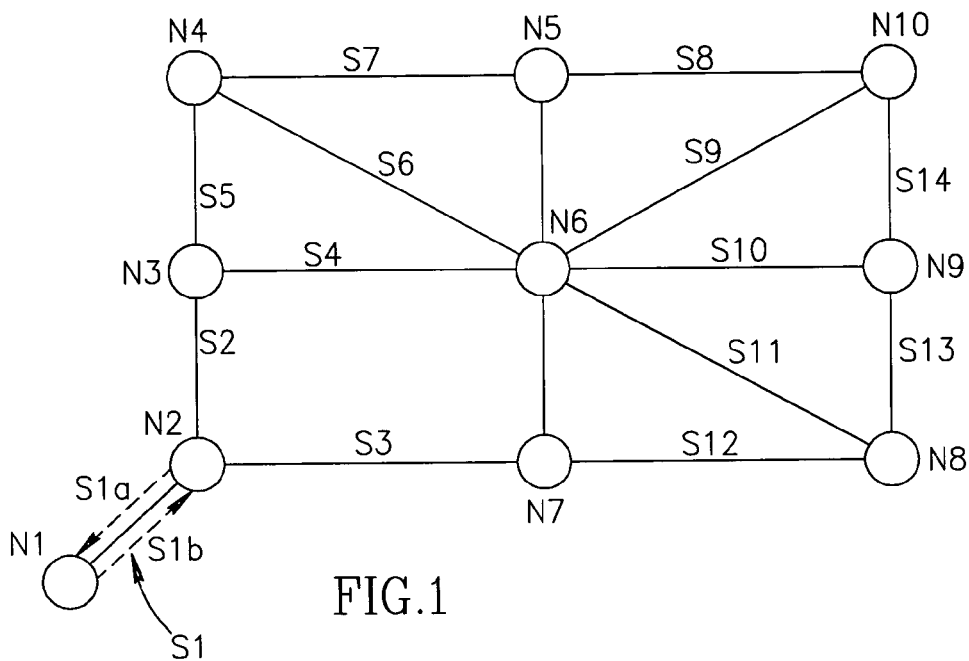
FIG. 1 schematically illustrates a mesh network.

FIG. 1 shows a schematic mesh network where nodes N1-N10 are interconnected by links S1-S14. In this network, node N1 will be the originating node (ON) with respect to the associated link S1, since according to the definition, the node N1 is authorized (or capable) to detect alarms directly from this span and therefore to create and insert a status of this particular link in an FU message which the node N1 creates at the time. Simultaneously, the node N1 is a non-originating node (NON) for any other link in the network of FIG. 1, since none of the links except for S1 can be directly inspected by this node from the point of alarms. Owing to that, node N1 may only forward the status of the particular link received in an FU message from other node or nodes (in this case, only from node N2).

Likewise, node N2 might be considered the originating node (ON) for links S1, S2, S3, while for any other link it can be only a non-originating node NON.

At this point of the description, it should be clarified that only one node can be the originating node for a particular connection, and therefore each link is considered to comprise a couple of component unidirectional spans. For example, the drawing shows that link S1 is comprised of a span S1a and a span S1b. Span S1a is directed from N2 to N1, and N1 is considered its originating node since it is capable of directly sensing alarms from the incoming span. Span S1b goes from N1 to N2, so N2 is the originating node of S1b.

Figure 2:
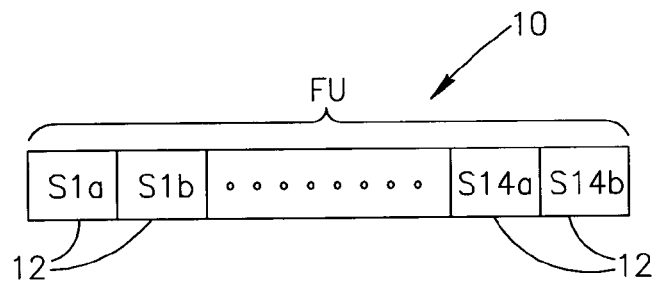
FIG. 2 schematically illustrates an FU (Fault Updating) message.

FIG. 2 schematically illustrates an FU message as a binary map 10 having as many fields 12, as the number of spans in the mesh network shown in FIG. 1. Each of the fields 12 serves for reflecting a current status of a specific span, in one-to-one correspondence. Each span may have a number of statuses, those can be indicated by predetermined binary codes. In a particular case, each field 12 comprises several bits which can be used for carrying a specific binary code. The status of a span is defined by the presence/absence of one or more specific alarms which are detected on this span by its originating node, the status is then transmitted within the FU message to other nodes of the network.

Figure 3:
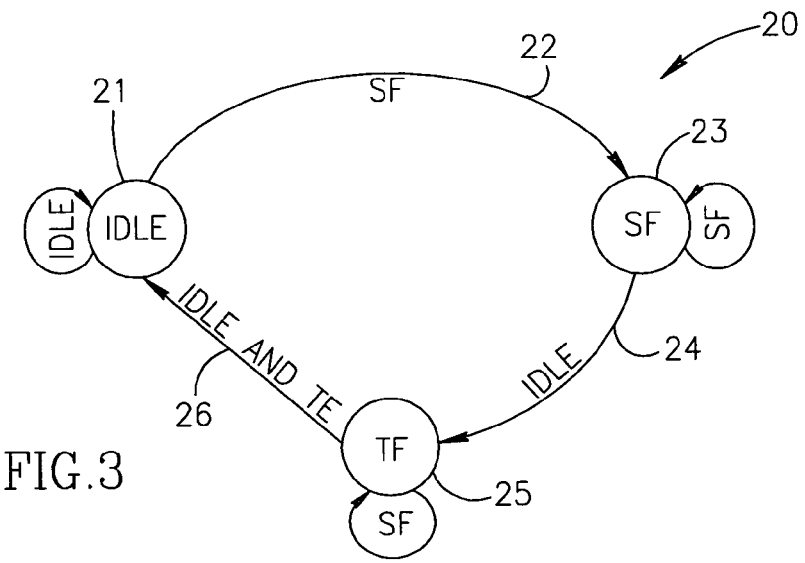
FIG. 3 illustrates a simplified version of a state machine SM of an originating node, used by a node in the originating mode.

FIG. 3 illustrates a simplified example of a State Machine (SM) of an originating node which, according to the invention, is implemented in each node of the network for each of its associated spans. The SM reflects, by its states, possible statuses of a particular span associated with the originating node. This exemplary SM (marked 20) comprises the minimal number of states (3 states) which are as follows:

a. Normal or IDLE (marked 21)—the state when the particular span is in service with no anomalies. A node functioning in its originating mode (the originating node ON) will introduce the status "idle" in the FU message with respect to this particular span. The status will be coded by a predetermined binary code in a corresponding field of the FU message.

b. Signal Failure (SF), marked 23—when the originating node ON receives alarms which represent an out-of-service condition (e.g., LOS from its particular associated span, it is considered as a signal failure signal and it causes a transition 22 from the state IDLE to the state SF. The new state SF of the state machine SM (indicating the status of this particular span) is introduced in the FU message produced by the originating node, in the form of another binary code in the same field.

c. Transient Failure (TF), marked 25—the state which is considered to start after the SF state is cleared, i.e. when alarms disappear on the span (the transition 24 is caused by a condition "idle" on the span). The state TF terminates after the clear condition is stable for a predetermined time. During this defined period, the status of the span in the FU message issued from the Originating Node will be stated as TF. After terminating the TF state the state machine transits to the IDLE state 21 (the transition 26 occurs when the span condition "idle" lasts for the predetermined time TE).

Direction of transitions in the SM is strictly determined: the state machine 20 performs transitions from state to state only in the direction of a→b→c→a.

Figures 4, 5:
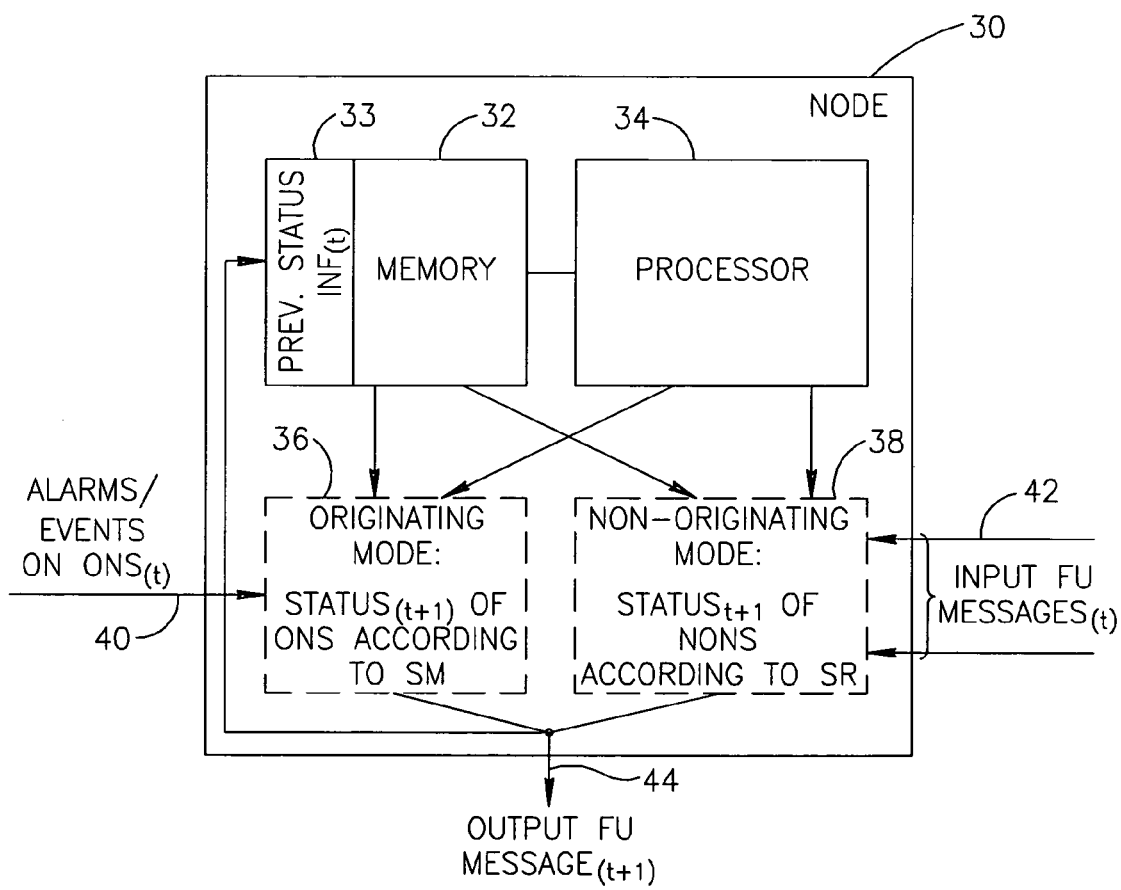
FIG. 4 schematically illustrates a simplified table of priorities which can be used by a network node as status rules for updating status of non-originating network spans (NONS).
FIG. 5 illustrates operation of a network node according to the invention, using a schematic block-diagram of the node.

FIG. 4 illustrates an example of a priority table 28, which can be utilized as rules for making decisions on status of a particular span at a node which is a non-originating node (NON) for this span. (Such a node acts in a non-originating mode with respect to this span).

As has been mentioned in the preceding portion of the description, status of a particular span is actively controlled (originated) at its originating node (ON) to which this span is physically related and assigned. For spans not related to a particular node the situation is different: this node acts for them as a non-originating node (NON) which does not actively create (does not originate) their status.

Since, during the network operation, any network node is informed about the current status of many non-related to it spans in the network by adjacent nodes (and these nodes may be updated or not yet updated in respect of these spans), some behavior instructions are to be used by such a node. In the frame of the present application, such instructions are called status rules of the non-originating nodes. These instructions must assist each NON in making correct decisions as of which status of a particular NONS (non originating span) should be transmitted from the NON in any specific case.

Generally, the rules are as follows:

a) in most cases, the status of a particular span NONS which was transmitted by the NON in its previous output FU message (a so-called previous status) is considered for making decisions on a new current status of the span; NON makes a decision, whether to update the previously known status of any particular NONS in the output FU message, only when the status of said NONS in at least one FU message received at the node differs from the previous status of said particular NONS known to said node.

b) if all FU messages which can be received at NON from other nodes comprise equal statuses of a particular span, the new status of this span for transmitting it from the NON should be selected equal to that received in the FU messages and regardless the previous status of the span.

c) if a discrepancy is found between the previous status of a span and its status in a single FU message coming to NON, or between statuses of one and the same span in two or more FU messages coming to NON, the discrepancy should be resolved to the favor of the status information which is considered "fresher", among all the considered statuses including the previous status, from the point of the above-mentioned state machine SM.

Example 1 let the previous status of a span transmitted from NON be SF, and now two or more FU messages are received at NON, all stating status IDLE for this span. The NON should issue a new FU message with the status IDLE, since most probably, this node happened to be the last node in the network which is informed on the change of status of this particular span with a delay.

Example 2 let several different FU messages be received at NON, and there is at least one FU message where the status of a particular span is one step downstream (forward) from the previous status of this span according to the transition direction of the state machine SM. Let the previous status of the span be IDLE and the downstream status be SF. In this situation, the NON should issue FU message with the SF, i.e., the downstream status regarding the previous one. The meaning of such a decision—the downstream (forward) status is most probably a "fresher" new update, which is not yet known by other nodes.

The same decision will be made if NON with the IDLE status of a particular span receives just a single FU message with the SF status of this span. The NON node will "believe" to this message and change the span status to SF.

Example 3

NON receives some FU messages carrying, for a particular span, codes of the same (unchanged previous) status and of an upstream status with respect to the previous status: say, the previous status is IDLE and the upstream (backward) status is TF. In this case, the NON should issue a new FU message with the unchanged status IDLE. The meaning of such a decision—the upstream status is most probably a non-updated version, while our node has likely been updated before the present FU message and already has a "fresher" status.

The same decision will be made if a single FU message is received: NON with the IDLE status of a particular span receiving a single FU message with the TF status of this span will "not believe it" and leave the IDLE status for the span.

The last rule (c) is actually cast into a table of priorities similar to that shown in FIG. 4, which table is especially useful in case there are a lot of specific alarms to be considered (i.e., the State Machine is complex), and in case when different FU messages are received at one NON.

In the table of FIG. 4, the left-hand column shows the previous status of a particular span (NONS) which is currently known to a specific NON. All the remaining columns are assigned for various statuses of the span which may be indicated in new FU messages incoming this specific NON. Numbers in the boxes of the table indicate priorities, according to which the NON should make decisions with respect to a new status of the span. The lower the number, the higher the priority.

The new status selection is provided as follows. Let the NON keeps for a specific span the previous status TF (see the bottom line).

If it receives three input FU messages, each stating different statuses for the same span (IDLE, SF and TF), the highest priority status will be selected—it is the status IDLE.

If SF and TF statuses are received in respective two input FU messages, the TF status will be selected since it has the higher priority.

If only one FU message with the SF status is received (but more FU messages may arrive to this NON), the previous status TF will be preserved since it has the higher priority than SF.

And, of course, if all the incoming FU messages state one and the same status for a particular span (say, all SF) it will be adopted regardless the previous status of the span.

In case a node is connected only to one adjacent node and thus can be informed only by this single adjacent node via a sole FU message (in FIG. 1, node N1 can be informed only by node N2), the status rules will accept a primitive form (see rule b). In this example, N1 will always agree with statuses of all non-related spans as received in the sole FU message from N2.

The method proposed and described above with the aid of the attached drawings enables for the maximally swift updating of fault information in the mesh network.

It should be kept in mind that the illustrated table is a simplified example and more complex tables (comprising more lines and columns and more variations of priorities) can be built for other more complex state machines SM and combinations of alarms.

The complex state machines (SM) considering more alarms comprise not only more states; the transitions may become not so straight forward i.e., the SM may transit to more than one states from one particular state, though only one option is to be implemented. In such cases tables of priorities are the most preferred tool for making decisions on the new status of a particular span.

FIG. 5 illustrates a schematic block-diagram of a particular node 30 comprising a memory 32 and a processor 34. The node is capable of operating in the originating mode (schematically marked by dotted contour 36) for originating spans ONS, and in the non-originating mode (schematically indicated by a dotted contour 38) for non-originating spans NONS. Both of these modes are performed independently from one another and utilize the memory and the processing resources. The memory accommodates a program of State Machine of an originating node, Status Rules for non-originating nodes and stores a previous status information on the network spans (schematically marked 33) known in the node 30 by the current time period.

Functions of the node can be explained using a descriptive example of synchronizing time clocks t, t+1 and t−1. However, the node may work asynchronously and is preferably software-controlled rather than hardware-controlled. Also, selecting borders of the time periods (clocks) are rather schematic and can be set in a different manner.

The node 30 is capable of detecting alarms/events taking place on the originating spans thereof at clock t (this capability is indicated by arrow 40). The alarms and events on the originating spans are processed in the originating mode 36 of the node, using the State Machine (SM) of an originating node. The processing result is the updated status information of the originating spans ONS of the node.

The node 30 is also capable of receiving a number of FU messages (marked 42) from adjacent nodes. Each FU message carries status information about all spans of the network at clock (t). Status information about the NONS spans is processed in the non-originating mode 38 of the node using the Status Rules (SR). The processing result received at the non-originating mode comprises the updated status information about the NONS spans of the node. For both modes, the processor 34 uses the previous status information 33 available at clock (t), which is based on data 40 and 42 obtained at clock t−1.

The combined updated status information covering all spans of the network forms an output FU message 44 of the node, which is issued at clock t+1. This message is transmitted from node 30 to adjacent nodes (not shown), and is also stored in the memory 32 to be used, at the next clock, as a previous status information 33.

While the invention has been described with reference to a number of particular examples, it should be appreciated that many variations of building the failure updating message might be suggested, other alarms may be considered, different state machines might be defined for determining states of nodes, as well as the status rules may be modified. Such and other variations should be considered part of the invention.

The invention claimed is:

1. A method for dissemination of information about faults in spans that interconnect nodes in a telecommunication mesh-type network, the method comprises creating a Failure Updating channel (FU channel) in the network and circulating Failure Updating messages (FU messages) via said FU channel between the network nodes, wherein each of the FU messages is issued by a particular node, disseminated to all its adjacent nodes and carries information currently available to said particular node about all spans in the network, by presenting status indications of the spans in respective information slots of the FU message, wherein said FU messages comprise the following message types:

an input FU message being an FU message entering a network node from an adjacent node during a time period t, and carrying status information on all spans of the network available to the adjacent node;

an output FU message being an FU message issued by the network node after the time period t and comprising updated status information on all spans of the network which has become available to the network node during the time period t; and a previous output FU message being an FU message issued by the network node during the time period t, and comprising the previous status information on all network spans, known to the node by the time period t.

2. The method according to claim 1, wherein a number of the information slots in the FU message is not less than a number of spans in the network, and wherein each of the slots is adapted to carry a status indication of a particular network span in a form of a predetermined binary code.

3. The method according to claim 1, comprising creating the FU channel in the information channel of the network.

4. The method according to claim 3, comprising creating the FU channel using overhead bytes of a SONET/SDH frames for periodically transmitting said FU messages via said bytes.

5. The method according to any claim 1, wherein said mesh-type network is an optical network provided with an optical supervisory channel (OSC), the method comprising using said OSC channel as the FU channel.

6. The method according to claim 1, ensuring simultaneous operation of each of the network nodes in two modes being an originating mode and a non-originating mode, in the originating mode, a node is considered an originating node (ON) with respect to at least one associated span (ONS) on which the node is capable of directly detecting one or more events and thereby of originating the span's status, and in the non-originating mode, a node is considered a non-originating node (NON) with respect to any other span (NONS) in the network, not associated with the non-originating node.

7. The method according to claim 1, wherein in the step of circulating the FU messages each network node receives, during one time period t, one or more said input FU messages from its adjacent nodes and issues one said output FU message to the adjacent nodes.

8. A method for dissemination of information about faults in spans that interconnect nodes in a telecommunication mesh-type network, the method comprises creating a Failure Updating channel (FU channel) in the network and circulating Failure Updating messages (FU messages) via said FU channel among all the network nodes, so that each of the nodes, whenever issuing an FU message, disseminates said FU message to all its adjacent nodes, wherein the FU message carries information about all spans in the network currently available to said node by presenting status indications of all the spans in respective information slots of the FU message, and so that each of the nodes updates the information currently available to it based on one or more FU messages received from its adjacent nodes;

wherein the method ensures simultaneous operation of each of the network nodes in two modes being an originating mode and a non-originating mode, in the originating mode, a node is considered an originating node (ON) with respect to at least one associated span (ONS) on which the node is capable of directly detecting one or more events and thereby of originating the span's status, and in the non-originating mode, a node is considered a non-originating node (NON) with respect to any other span (NONS) in the network, not associated with the non-originating node, and wherein the step of circulating the FU messages comprises performing the following actions at each network node and at each clock:

for one or more spans (ONS) associated with said node (ON), originating respective status information;

for spans (NONS) not associated with said node (NON), forming respective status information based on the previous status information and status information in one or more input FU messages available in said node;

combining the status information originated for ONS and the status information formed for NONS and forwarding it to all adjacent nodes as an output FU message of said node.

9. The method according to claim 8, wherein the step of originating status information for the ONS spans comprises:

defining a state machine (SM, 20) of an originating node, assigned to a particular span (ONS) associated with its originating node (ON), the state machine comprising more than two states and providing transitions from state to state; said states and transitions depending on presence or absence of said one or more events on a particular span (ONS), wherein the states of the state machine (SM) respectively correspond to possible statuses of a particular span (ONS);

providing at each node of the network one or more said state machines (SM) respectively assigned to one or more spans (ONS) associated to said node, thereby ensuring that status of each particular span of the network is originated and permanently updated at its associated ON.

10. The method according to claim 8, wherein the step of forming the status information for the NONS spans comprises:

storing, at each node of the network, a previous output FU message of the node reflecting the previous status information on all spans of the network known to the node;

applying, at each node of the network, status rules for forming status information for the NONS spans based on the respective previous status information and respective status information in the one or more input FU messages.

11. The method according to claim 10, wherein the status rules comprise a table of priorities identical for all nodes throughout the network.

12. The method according to claim 11, wherein the priorities are arranged by taking into account:

the previous status of a particular NONS transmitted by said node in the previous output FU message, status(es) of the particular span NONS received at the node in one or more input FU messages, direction of transitions of the state machine SM.

13. The method according to claim 12, wherein the priorities are stated as follows:

the highest priority is assigned to a status of the particular NONS span corresponding to such a state of the state machine SM which is positioned one transition forward from the state of said machine corresponding to the previous status of the NONS span, the priority lower than but next to the highest is assigned to the previous status of said NONS span, i.e. to its unchanged status, the lowest priority is assigned to a status of the particular NONS span corresponding to such a state of the state machine SM, which is positioned one transition backward from the state of the state machine SM corresponding to the previous status of the NONS span.

14. The method according to claim 13, wherein the step of forming the status information for the NONS spans further comprises the following sub-steps:

if the status of a particular NONS span is equal in all input FU messages which can be received at the node, accepting said equal status for the output FU message regardless a previous status of said NONS;

when receiving input FU messages carrying different statuses with respect to one and the same NONS, selecting for the output FU message such a status of said span which has the highest priority among those received at said NON including the previous status of said NONS.

15. A system for implementing the method according to claim 1.

16. A system for dissemination of information about faults in spans that interconnect nodes in a telecommunication mesh network, the system comprises a fault updating (FU) channel for circulating input and output FU messages between nodes of the network, the FU messages carrying status information on all network spans; the FU channel being arranged by providing each node in the mesh network with means for receiving the input FU messages from its adjacent nodes and means for transmitting the output FU messages to its adjacent nodes; each node being provided with a memory and a processing means for updating status information of all network spans in its output FU messages.

17. The system according to claim 16, wherein each of the nodes is provided with means for detecting events on one or more network spans associated with said node and a state machine SM for originating, based on said events, status information concerning said spans (ONS); and also provided with status rules for updating status information concerning network spans not associated with said node (NONS).

18. The system according to claim 17, wherein the memory of a node being utilized for storing a previous output FU message, the events, the SM, the input FU messages and the status rules SR; the processing means being operative to perform the SM transitions to obtain status information of the ONS spans, capable of applying the status rules SR to form status information of the NONS spans, and adapted to combine the obtained status information of all network spans in an output FU message of the node.

* * * * *